(12) United States Patent
Tong

(10) Patent No.: US 12,168,379 B2
(45) Date of Patent: Dec. 17, 2024

(54) SHOCK ABSORBER WITH A BEARING HOUSING BYPASS ASSEMBLY

(71) Applicant: Fox Factory, Inc., Duluth, GA (US)

(72) Inventor: Ivan Tong, Odenton, MD (US)

(73) Assignee: Fox Factory, Inc., Duluth, GA (US)

( * ) Notice: Subject to any disclaimer, the term of this patent is extended or adjusted under 35 U.S.C. 154(b) by 418 days.

(21) Appl. No.: 17/529,122

(22) Filed: Nov. 17, 2021

(65) Prior Publication Data

US 2022/0176769 A1 Jun. 9, 2022

Related U.S. Application Data

(60) Provisional application No. 63/115,933, filed on Nov. 19, 2020.

(51) Int. Cl.
*B60G 17/027* (2006.01)
*B60G 15/06* (2006.01)
*B60G 17/015* (2006.01)
*B60G 17/016* (2006.01)

(52) U.S. Cl.
CPC ....... *B60G 17/0272* (2013.01); *B60G 15/065* (2013.01); *B60G 17/0152* (2013.01); *B60G 17/016* (2013.01); *B60G 2202/312* (2013.01); *B60G 2400/10* (2013.01); *B60G 2400/20* (2013.01); *B60G 2400/25* (2013.01); *B60G 2401/11* (2013.01); *B60G 2401/17* (2013.01); *B60G 2500/22* (2013.01); *B60G 2600/22* (2013.01)

(58) Field of Classification Search
CPC ...... F16F 9/48; F16F 9/00; F16F 9/185; F16F 9/3257; F16F 9/3484; F16F 9/50; F16F 9/065; F16F 9/062; F16F 9/346; F16F 9/3235; B60G 15/065; B60G 17/08; B60G 17/016; B60G 17/0152; B60G 2202/312; B60G 2206/41; B60G 2400/10; B60G 2400/20; B60G 2400/25; B60G 2401/17; B60G 2401/11; B60G 2500/11; B60G 2500/22
USPC ....................................... 267/217; 188/282.8
See application file for complete search history.

(56) References Cited

U.S. PATENT DOCUMENTS

| | | |
|---|---|---|
| 8,838,335 B2 | 9/2014 | Bass et al. |
| 9,353,818 B2 | 5/2016 | Marking |
| 9,623,716 B2 | 4/2017 | Cox |
| 10,036,443 B2 | 7/2018 | Galasso et al. |
| 2003/0047397 A1* | 3/2003 | Farr ........................ F16F 9/346 188/282.8 |
| 2013/0220961 A1* | 8/2013 | Smith ....................... F16F 9/19 188/315 |

(Continued)

*Primary Examiner* — Robert A. Siconolfi
*Assistant Examiner* — San M Aung

(57) ABSTRACT

A shock assembly is disclosed. The assembly includes a damper chamber having an outer wall with a first inner diameter (ID). A secondary chamber within the damper chamber, the secondary chamber comprising an exterior wall with an external diameter (ED) less than the ID of the outer wall to form an annular region therebetween. A damping piston coupled to a piston rod, the damping piston disposed in the secondary chamber and axially movable relative to the secondary chamber, the damping piston to bifurcate the secondary chamber into a compression side and a rebound side. A valve to control a flow of a working fluid between the annular region and the secondary chamber.

16 Claims, 11 Drawing Sheets

(56) References Cited

U.S. PATENT DOCUMENTS

| | | | |
|---|---|---|---|
| 2015/0226283 A1* | 8/2015 | Marking | F16F 9/346 |
| | | | 188/315 |
| 2016/0290431 A1* | 10/2016 | Marking | F16F 9/48 |
| 2018/0266510 A1* | 9/2018 | Jee | F16F 9/325 |
| 2019/0226545 A1* | 7/2019 | Schmidt | F16F 9/067 |

* cited by examiner

793

| | 606 | | 616 | |
|---|---|---|---|---|
| | Diameter | Location on Inner Tube 0=full extension end | Diameter | Location on Inner Tube |
| Bearing Bypass | Ø.188 (x6) | 0 | N/A | |
| Bypass 3a | Ø.25 | 3.5 | Ø.2 | 10.25 |
| Bypass 4a | Ø.25 | 4.1 | N/A | |
| Bypass 1a | Ø.125 | 9.75 | Ø.2 | 9.25 |
| Bypass 2a | Ø.2 | 10.25 | Ø.125 | 9.75 |
| Bypass 1b | Ø.125 | 11.25 | Ø.125 | 11.25 |
| Bleed 1 | Ø.1 | 3.5 | Ø.1 | 9.75 |
| Bleed 2 | Ø.1 | 4.1 | Ø.1 | 9.75 |
| Bleed 3 | Ø.1 | 9.75 | Ø.113 | 10.75 |
| Bleed 4 | Ø.1 | 10.75 | N/A | |
| Refill | Ø.149 (x5) | 9.25, top of ride zone | Ø.25 (x5) | 4.1 |

FIG. 16

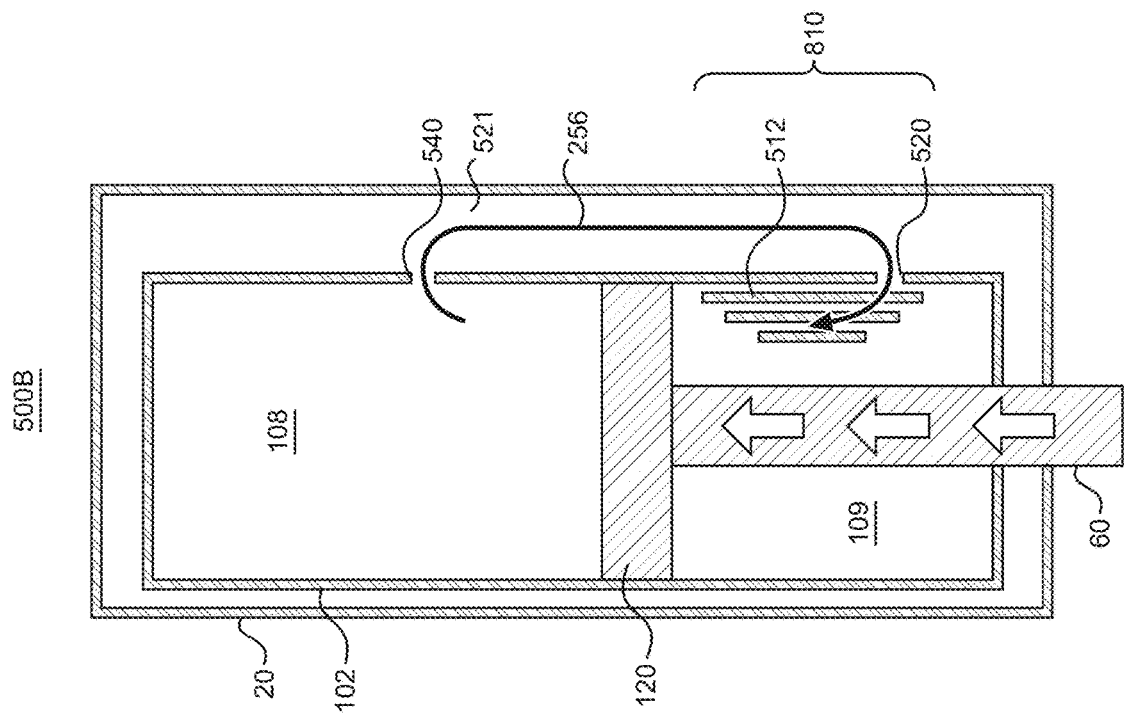
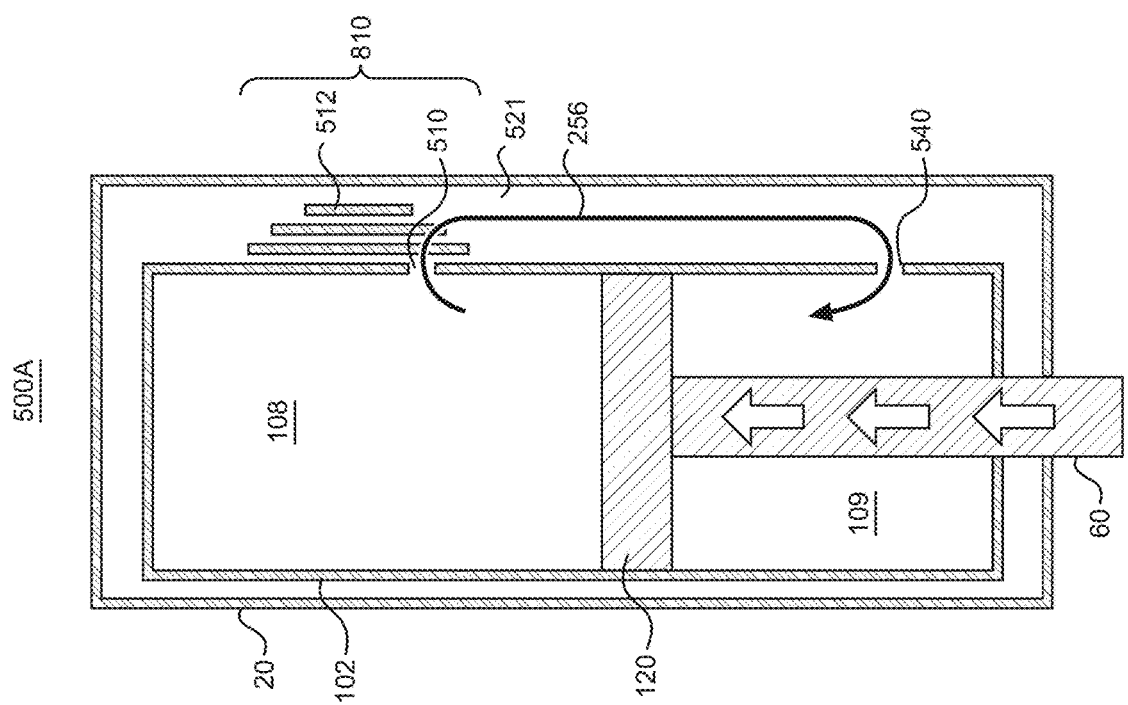

SHOCK ABSORBER WITH A BEARING HOUSING BYPASS ASSEMBLY

CROSS-REFERENCE TO RELATED APPLICATIONS (PROVISIONAL)

This application claims priority to and benefit of U.S. Provisional Patent Application No. 63/115,933 filed on Nov. 19, 2020, entitled "SHOCK ABSORBER WITH A BEARING HOUSING BYPASS ASSEMBLY" by Ivan Tong, and assigned to the assignee of the present application, the disclosure of which is hereby incorporated by reference in its entirety.

FIELD OF THE INVENTION

Embodiments of the invention generally relate to methods and apparatus for use in vehicle suspension. Particular embodiments of the invention relate to methods and apparatus useful for vehicle shock assemblies.

BACKGROUND OF THE INVENTION

Vehicle suspension systems typically include a shock assembly. Often shock assemblies include a spring component or components and a damping component or components to control compression and rebound of the suspension system. The shock assemblies can be set up to provide a comfortable ride, to enhance performance of a vehicle, and the like.

BRIEF DESCRIPTION OF THE DRAWINGS

FIG. 16 is a table illustrating a number of different aperture sizes and locations for one or more apertures of the bypass assembly, in accordance with one embodiment.

FIG. 17A is a schematic diagram of a bypass assembly configuration for a compression bypass, in accordance with one embodiment.

FIG. 17B is a schematic diagram of another bypass assembly configuration for a compression bypass, in accordance with one embodiment.

Figure 1:
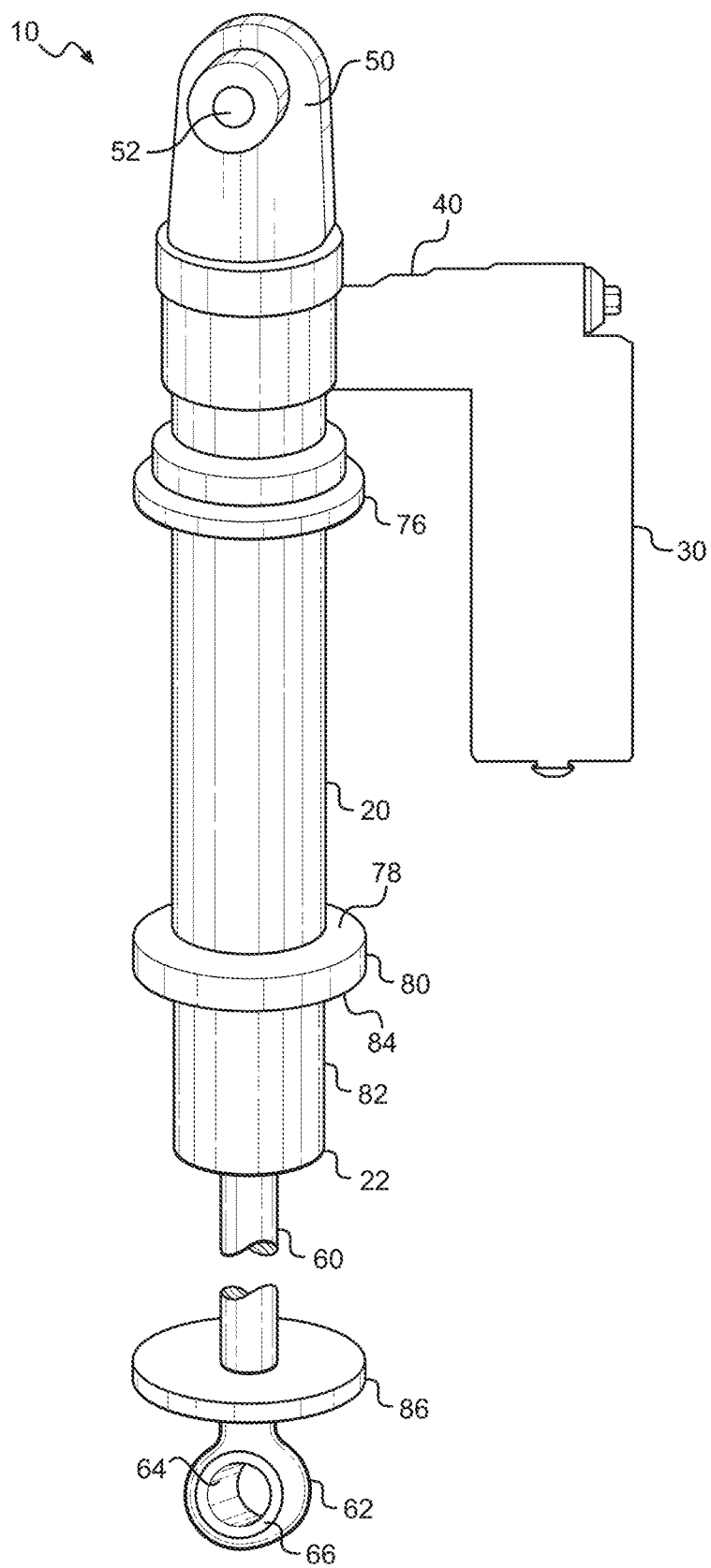
FIG. 1 is a perspective view of one embodiment of a shock assembly with a new bypass assembly configuration, in accordance with one embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface and some or all of the rest of the vehicle that is not in contact with the surface. For example, the portion of the vehicle that is in contact with the surface can include one or more wheel(s), skis, tracks, hulls, etc., while some or all of the rest of the vehicle that is not in contact with the surface include suspended portions such as anything on a frame, a seat, handlebars, engines, cranks, etc.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the damper has been reduced to a minimum size for a given damper, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

The term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blow-out, and vehicle rollover.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

A damper, such as a strut or shock assembly, often include a damper body surrounded by or used in conjunction with a mechanical spring or constructed in conjunction with an air spring or both. The damper often consists of a damping piston 120 and piston rod 60 telescopically mounted in a fluid filled cylinder (or damper housing). The damping or working fluid may be, for example, hydraulic oil. A mechanical spring may be a helically wound spring that surrounds or is mounted in parallel with the damper body. As used herein, the terms "down" "up" "downward" upward" "lower" "upper" and other directional references are relative and are used for reference only.

In one embodiment, the disclosed damper is a position-sensitive shock assembly in which the position-sensitive damping can be different during compression and rebound strokes. In one embodiment, the shock assembly includes at least one damping adjuster which varies the damping provided during compression and/or rebound strokes.

In one embodiment, the position-sensitive shock assembly includes a dual walled cylinder (damper housing) having an interior wall and an exterior wall and a fluid channel therebetween. In one embodiment, a damping piston is movably mounted to a piston rod and moves between the first and second ends of the damper housing. A number of bypass openings open are provided through the interior wall of the damper housing at axially spaced-apart positions. The bypass openings are coupled by a bypass channel (e.g., a portion of the fluid channel). In one embodiment, a flow valve is positioned along the bypass channel permitting and/or restricting fluid flow from moving through the bypass opening and into or out of the bypass channel.

In one embodiment, the bypass opening may be selectively sealed by, for example, a movable closing member which is used to selectively cover or uncover the bypass opening. This selective sealing can be through the use of electromagnetic energy. Alternatively, the closing member can be biased to either cover or uncover the opening, the closing member overcoming the biasing force when a shock assembly is accelerated to an appropriate degree. In one embodiment, the bypass opening is selectively sealed by a valve, such as a check valve, a shim stack, or the like.

In one embodiment, the shock assembly with a bearing housing bypass assembly would be used as part of a vehicle's suspension. In one embodiment, the shock assembly with a bearing housing bypass assembly is used on any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on-and/or off-road vehicle, or the like. In general, a motorized bike can include a bike with a combustion motor, an electric bike (e-bike), a hybrid electric and combustion bike, a hybrid motor and pedal powered bike, and the like. In one embodiment, a vehicle may utilize more than one shock assembly with a bearing housing bypass assembly.

In one embodiment, the shock assembly with a bearing housing bypass assembly is passive. In one embodiment, the shock assembly with a bearing housing bypass assembly will include one or more active valves.

Referring now to FIG. 1, a perspective view of an exterior structure of a shock assembly 10 is shown in accordance with one embodiment. In one embodiment, shock assembly 10 includes a damping cylinder 20 and an optional remote reservoir 30. Shock assembly 10 also includes an attachment projection 50 through which a bushing 52 extends, for attaching the attachment projection 50, and thus one end of the shock assembly 10, to a suspension or vehicle frame component.

At the end 22 of the damping cylinder 20 opposite to the connection thereof to the valved interconnection housing 40, a piston rod 60 extends. The distal end 62 of the piston rod 60 surrounds a bushed opening 64, through which a bushing 66 extends. The distal end 62 of the piston rod 60 is thereby interconnected to the other of one of a vehicle frame or suspension components via the bushing 66 providing a second connection point for shock assembly 10.

In general, upon the movement of the piston rod 60 inwardly of the damping cylinder 20 (e.g., during a compression stroke) the overall length of shock assembly 10 will be reduced. In contrast, upon partial retraction of the piston rod 60 from the body of the damping cylinder 20 (e.g., during a rebound stroke), the overall length of shock assembly 10 will be increased.

Figure 2:
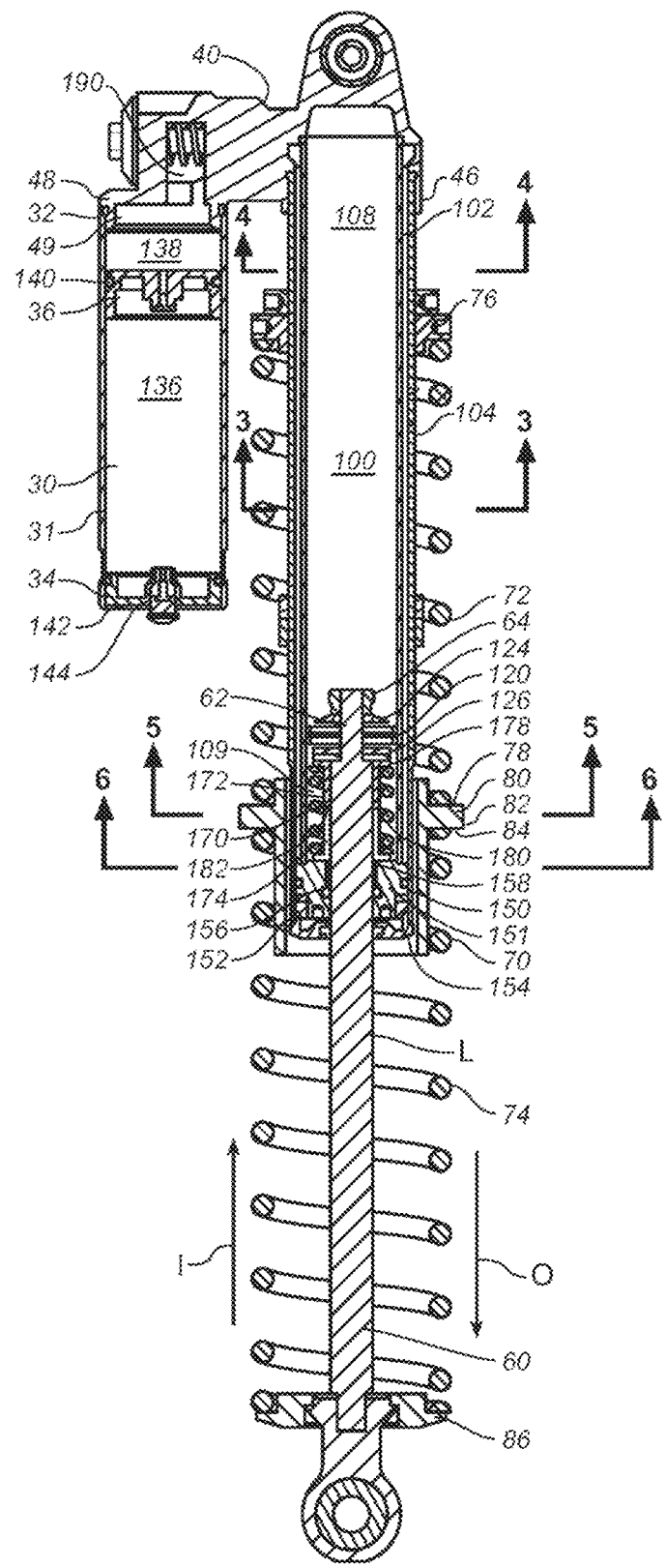
FIG. 2 is a sectional view of the shock assembly of FIG. 1, showing the details of an interior thereof, in accordance with one embodiment.

Referring now to FIG. 2, a sectional view of the shock assembly of FIG. 1, showing the details of an interior thereof is shown in accordance with one embodiment. In one embodiment, the shock assembly 10 has a damping cylinder 20 having a main volume 100, in one embodiment, damping cylinder 20 includes a tubular body 102 (e.g., a secondary chamber, or the like), and an annular volume 106, formed between the outer diameter (OD) of tubular body 102 and the inner diameter (ID) of damping cylinder 20. In one embodiment, tubular body 102 may be of a different geometric shape other than a tube, the use of tubular herein is provided in accordance with one embodiment and used for purposes of clarity.

In one embodiment, shock assembly 10 is configured to carry a secondary spring element, such as, for example, a mechanical coil spring 70. In one embodiment, the mechanical coil spring 70 provides additional rigidity and compression damping and rebounding force in the shock assembly 10.

In one embodiment, the mechanical coil spring 70 is bifurcated into an upper spring 72 and a lower spring 74. The upper spring 72 extends between, and bears against, an upper annular spring plate 76 secured to the outer surface of the body of the damping cylinder 20, and an upper surface 78 of an intermediate annular spring plate 80, which extends circumferentially outwardly around the circumference of a spring sleeve 82, which is configured and sized to fit over, but freely move in an axial direction over, the damping cylinder 20.

The second, lower spring 74 extends from contact with the underside annular surface 84 of the intermediate annular spring plate 80, and into contact with a lower annular spring flange 86 extending outwardly from, and circumferentially around, the piston rod 60 adjacent to, but spaced in the damping cylinder 20 direction from, the distal end 62 thereof.

Referring now to FIGS. 2 to 6, in one embodiment, the fluid volume within the tubular body 102 is bifurcated by the damping piston 120 into two variable volumes: a compression volume 108 between the damping piston 120 and the opening of the damping cylinder 20 into the valved interconnection housing 40, and a rebound volume 109 which extends between the opposite side of the damping piston 120 to the inner face of seal housing 150.

In one embodiment, to provide one of the fluid pathways for fluid communication between the compression volume 108 and the rebound volume 109, a plurality of bypass openings are provided through the wall of the tubular body 102 between the inner volume of the tubular body 102 and the annular volume 106, and a plurality of passages (shown in detail beginning at FIG. 11) are provided at the interconnection location of tubular body 102 and the seal housing 150. Thus, during movement of the damping piston 120 within the tubular body 102, fluid may flow between the compression volume 108 and the rebound volume 109 portions of the tubular body 102 as the actual volume (size) of those volumes change as the damping piston 120 moves within the tubular body 102, from bypass openings through the annular volume 106 and into the rebound volume 109 through the passages 112, and, if the damping piston 120 is disposed intermediate of the openings, for example, wherein an opening is on one side of the damping piston 120 and another opening is on another side of the damping piston 120, flow may occur therethrough between the rebound and the rebound volume 109 and compression volume 108, respectively. These un-valved openings, and passages thus provide a direct, through restricted by the cross section and of the openings, flow pathway for fluid between the compression volume 108 and the rebound volume 109 during damping piston 120 movement within the tubular body 102.

Referring now to FIGS. 2, and 7-10, in one embodiment, the damping piston 120 is received over a reduced diameter, at least partially threaded, end portion 63 of the piston rod 60, and fixedly connected thereto by virtue of the nut 65 or other fastener threadingly secured on the reduced diameter end portion (e.g., distal end 62) to secure the damping piston 120 between the underside of the nut 65 and a circumferential shoulder 67 on the piston rod 60. The shim 124 is secured by the underside of the nut 65 against the compression side face of the damping piston 120, and the circumferential shoulder 67 and the rebound side face of the damping piston 120.

In one embodiment, the damping piston 120 includes about the outer circumference thereof a plurality of ring shaped lip or other types of seals 122, to enable sealing of the damping piston 120 against the inner surface of the tubular body 102 and thus across the damping piston 120 between the compression volume 108 and the rebound volume 109. Additionally, the damping piston 120 is configured to enable flow therethrough based upon the pressure difference between the compression volume 108 and rebound volume 109. This is enabled, in this embodiment, by the use of "shims" 124, 126, on either side of the damping piston 120, which are configured to selectively overlay one or more damping piston 120 openings 128, 130 extending through the damping piston 120 to selectively open fluid communication between the rebound volume 109 and compression volume 108, respectively. The stiffness of the shims, and the number and configurations of the shims, determines the differential pressure at which the shim will bend away from the damping piston 120 openings 128 or 130 and thus allow fluid flow from a higher pressure volume to a lower pressure volume directly there through.

Figure 7:
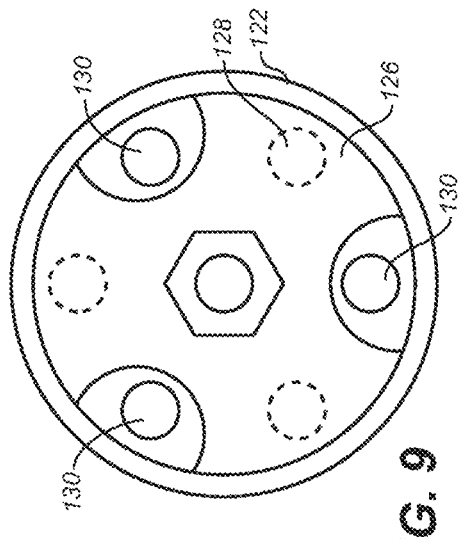
FIG. 7 is a perspective view of the damping piston 120 of the damper of FIG. 2, in accordance with one embodiment.
Figure 9:
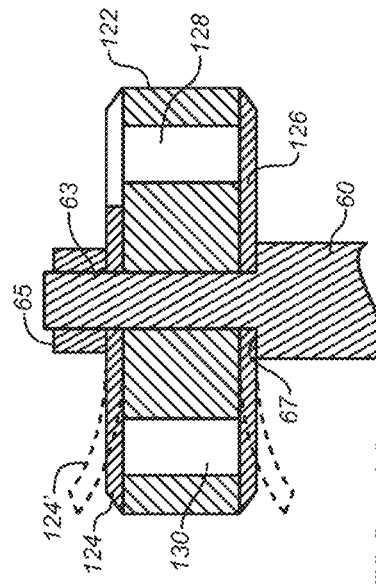
FIG. 9 is a bottom plan view of the damping piston 120 on FIG. 7, in accordance with one embodiment.
Figure 8:
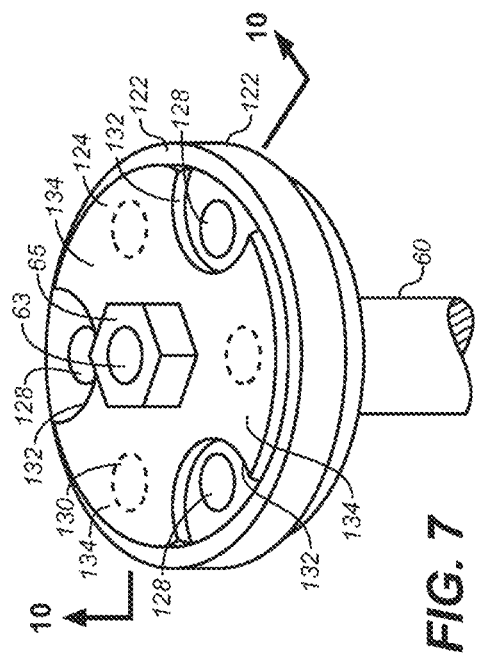
FIG. 8 is a top plan view of the damping piston 120 of FIG. 7, in accordance with one embodiment.
Figure 10:
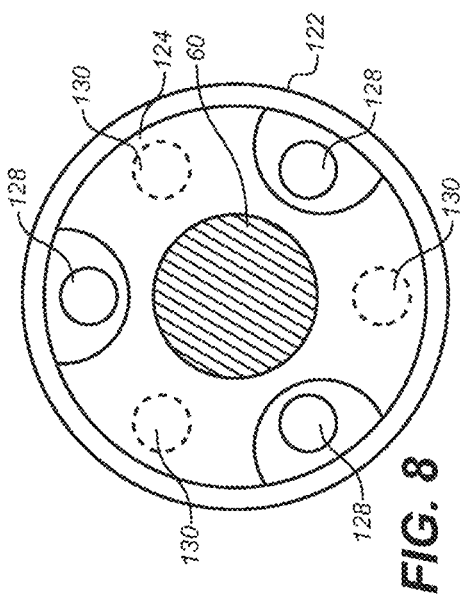
FIG. 10 is a sectional view of the damping piston 120 of FIG. 7 at section 10-10, in accordance with one embodiment.

In the embodiment shown, each of shims 124 and 126 are substantially identical in construct, and are a thin, stiff, but flexible material, such as thin shell sheeting, which is cut or stamped into a trilobular shape as shown in FIG. 8 such that a cutout 132 is provided in three locations equally spaced about the diameter of the shim 124, 126, such that the cutout 132 aligns with every other damping piston 120 opening 128, 130 about a circumference of the face of the damping piston 120 and a valve plate portion 134 located between the cutouts 132 positioned to overlay one of each of the damping piston 120 openings 128, 130 on one side of the damping piston 120. As shown in FIG. 7, cutouts 132 in the shim 124 are positioned on the compression volume 108 side of the damping piston 120 to enable unrestricted access of fluid into the damping piston 120 openings 128 of the damping piston 120, but position the valve plate portions 134 to overlay the damping piston 120 openings 130 (shown in outline). Likewise, the shim 126 (FIG. 9) includes cutouts which expose damping piston 120 openings 130 exposed to the compression volume 108 at the rebound volume 109 side thereof. As shown in FIGS. 10 and 124', when the pressure in the rebound volume 109 is sufficiently greater than that of the compression chamber, the valve plate portions 134 of the shim 124 may bend away from the surface of the damping piston 120 to enable communication through the damping piston 120 openings 130, in this case the damping piston 120 opening 130, which communication would otherwise be presented by the presence of the valve plate portion 134. Likewise, a sufficiently higher pressure in the compression volume 108, as compared to the rebound volume 109, will similarly result in the valve plate portion 134 of the shim 126 bending away from the surface of the damping piston 120 to enable fluid communication between the compression and rebound volumes, 108 and 109, respectively, via the damping piston 120 openings 128.

Referring again to FIG. 2, the remote reservoir 30 is configured to include a gas reservoir and to enable fluid to be received therein, adjacent to but sealed from the gas reservoir, from the damping cylinder 20, and is configured as a generally circular tube 31 having a first threaded end 32 threadingly attached to the threads on the threaded projection 49 of the second boss 48 of the valved interconnection housing 40, and an opposed threaded end 34, within which is threadingly received in a fill valve housing 142 having a fill valve 144 extending therethrough. A floating piston 36 (e.g., gas piston) is received within the circular tube 31, such that a gas volume 136 and a fluid volume 138 are defined at the opposed surfaces of the floating piston 36. The floating piston 36 includes an O-ring or other type of seal 140 within, and extending from, a groove about its circumference to seal the gap between the floating piston 36 and the inner wall of the circular tube 31 of the remote reservoir 30, and the floating piston 36 is not configured to enable deliberate flow of fluid or gas there past. The gas volume is typically filled with nitrogen or another gas, the pressure of which is user settable at the fill valve 144.

During a compression stroke of the damping piston 120 within the damping cylinder 20, i.e., a movement of the damping piston 120 inwardly of the tube in the direction I of FIG. 2, fluid in the compression volume 108 of the damping cylinder 20 can flow through the valved interconnection housing 40 and into the fluid volume 138 of the remote reservoir 30, resulting in movement of the floating piston 36 in the direction of the valve plate portion 134 to decrease the size of the gas volume 136. Additionally, fluid in the fluid volume 138 may communicate through the valved interconnection housing 40 to the annular volume 106 of the shock assembly 10, and thus with the rebound volume 109 of shock assembly 10. Likewise, during a rebound stroke of the damping piston 120, wherein the damping piston 120 moves in the damping cylinder 20 in the direction θ of FIG. 2, fluid in the fluid volume 138 of the reservoir may move through the valved interconnection housing 40 and into the compression volume 108 of the damping cylinder 20, and the fluid pressure in the fluid volume 138 may communicate, and fluid may flow, through the valved interconnection housing 40 to the compression volume 108 of the damping piston 120. This functionality, as will be described further herein, enables maintenance of the same fluid pressure, or nearly the same fluid pressure, on either side of the damping piston 120, and thus pressure drops in the rebound volume 109 during a high damping piston 120 velocity, and hence rapid increase in the rebound volume 109, can be prevented or significantly ameliorated.

Referring again to FIGS. 2 and 6, the lower piston rod 60 receiving portion of the damping cylinder 20 is sealed by a seal housing 150 located adjacent to, and slightly inwardly of, the lower end 152 of the outer tube 104 of the damping cylinder 20, and which is secured within the outer tube 104 by a cover 154 which is threadingly secured within the lower end of the outer tube 104. The seal housing 150 includes an inner, sealed bore annular region 156 within which a sleeve shaped seal 158 extends in the axial direction of the piston rod 60. The plurality of passages 112 extend as notches or recesses over a span of the outer circumference of the seal housing 150 to enable flow between the annular volume 106 and the rebound volume 109 as described herein previously.

The innermost surface of the seal housing 150 is received within the lowermost end of the outer tube 104. The passages 112 communicate through the annular volume 106, and thus, when the damping piston 120 is moving in a compression stroke, fluid may flow between the openings 110 on the compression volume side of the damping piston 120 and the rebound volume, and vice-versa.

Referring again to FIG. 2, the lower end of the damping cylinder 20 also includes a bifurcated landing spool 170 configured as a pair of thin walled upper cylindrical body 172 and thin walled lower cylindrical body 174, each having an outwardly projecting flange 178 at the opposed ends of the bifurcated landing spool 170. A spring 180 is secured between the flanges 178, and in a free state, maintains a gap 182 between the thin walled upper cylindrical body 172 and thin walled lower cylindrical body 174. During a rebound stroke of the damping cylinder 20, as the damping piston 120 is moving in the direction of the seal housing 150 end of the tubular body 102, the underside of the damping piston 120 may land against the flange 178 of the thin walled upper cylindrical body 172, and then be further damped in the rebound direction by the spring 180.

In general, upon the movement of the piston rod 60 inwardly of the damping cylinder 20, fluid within the damping cylinder 20 may flow from the compression volume in the interior of the damping cylinder 20, through a flow passage in the valved interconnection housing 40, and hence into the remote reservoir 30. Also, during a compression stroke, valves may enable flow of fluid through the valved interconnection housing 40, and communication of fluid pressure, at the gas reservoir pressure, to the rebound side of the damping piston 120. Likewise, upon retraction of the piston rod 60 from the body of the damping cylinder 20, fluid may flow from adjacent the floating piston 36 in the remote reservoir 30, through a flow passage in the valved interconnection housing 40 and then into the compression volume of the damping cylinder 20, and fluid, and fluid may flow from the rebound side of the damping cylinder 20 to the remote reservoir 30, i.e., back through the valved interconnection housing 40.

In one embodiment, the lower piston rod 60 receiving portion of the damping cylinder 20 is sealed by a seal housing 150 located adjacent to, and slightly inwardly of, the lower end 152 of the outer tube 104 of the damping cylinder 20, and which is secured within the outer tube 104 by a cover 154 which is threadingly secured within the lower end of the outer tube 104. The seal housing 150 includes an inner, sealed bore annular region 156 within which a sleeve shaped seal 158 extends in the axial direction of the piston rod 60. The plurality of passages 112 extend as notches or recesses over a span of the outer circumference of the seal housing 150 to enable flow between the annular volume 106 and the rebound volume 109 as described herein previously.

The innermost surface of the seal housing 150 is received within the lowermost end of the outer tube 104. The passages 112 communicate through the annular volume 106, and thus, when the damping piston 120 is moving in a compression stroke, fluid may flow between the openings 110 on the compression volume side of the damping piston 120 and the rebound volume, and vice-versa.

In one embodiment, the lower end of the damping cylinder 20 also includes a bifurcated landing spool 170 configured as a pair of thin walled upper cylindrical body 172 and thin walled lower cylindrical body 174, each having an outwardly projecting flange 178 at the opposed ends of the bifurcated landing spool 170. A spring 180 is secured between the flanges 178, and in a free state, maintains a gap 182 between the thin walled upper cylindrical body 172 and thin walled lower cylindrical body 174. During a rebound stroke of the damping cylinder 20, as the damping piston 120 is moving in the direction of the seal housing 150 end of the tubular body 102, the underside of the damping piston 120 may land against the flange 178 of the thin walled upper cylindrical body 172, and then be further damped in the rebound direction by the spring 180.

Referring now to FIGS. 2-6, embodiments of the construction of the damping cylinder 20 are shown. The fluid volume within the tubular body 102 is bifurcated by the damping piston 120 into two variable volumes: a compression volume 108 between the damping piston 120 and the opening of the damping cylinder 20 into the valved interconnection housing 40, and a rebound volume 109 which extends between the opposite side of the damping piston 120 to the inner face of seal housing 150.

In one embodiment, the damping piston 120 disposed on the piston rod 60 moves within the damper housing in response to forces imposed on the housing and the rod. In general, the damping piston 120 divides the damping chamber into a bifurcated chamber having a compression side and a rebound side. However, the movement of the damping piston 120 is dampened by the presence of the fluid in the damper housing. In order for the damping piston 120 to move within the damper housing, fluid on one side of the damping piston 120 (e.g., on the compression side) must be able to move to another location (such as the rebound side) and vice-versa. In one embodiment, the fluid can move to the different side by passing through one or more openings such as, but not limited to, one or more valved openings in the damping piston 120, one or more valved openings in a bypass assembly, valved openings to an optional secondary reservoir fluidly connected to the damper housing, and the like.

In one embodiment, during at least a portion of a piston stroke, fluid on one side of the damping piston 120 is able to move through the damping piston 120, to the fluid volume on the opposite side of the damping piston 120, through one or more valves within the body of the damping piston 120.

In one embodiment, during at least a portion of the piston stroke, fluid on one side of the damping piston 120 is able to move to the fluid volume on the opposite side of the damping piston 120, through a bypass assembly (e.g., circumventing the damping piston 120). In one embodiment, the amount of fluid and the flow rate of the bypass is damping piston 120 location dependent. In other words, it will depend upon the location of the damping piston 120 within the damper housing.

In one embodiment, when a secondary reservoir is present, during at least a portion of a piston stroke fluid in the damper housing is able to move to the secondary reservoir through valved openings in the secondary reservoir fluidly connected to the damper housing.

Thus, in one embodiment, the rate of fluid flow between the fluid volumes on either side of the damping piston 120, and between the fluid volumes in the damper housing and the secondary reservoir, can be used to modify, adjust, or otherwise tune the dampening effect of the shock assembly upon the vehicle in which it is used.

Figure 11:
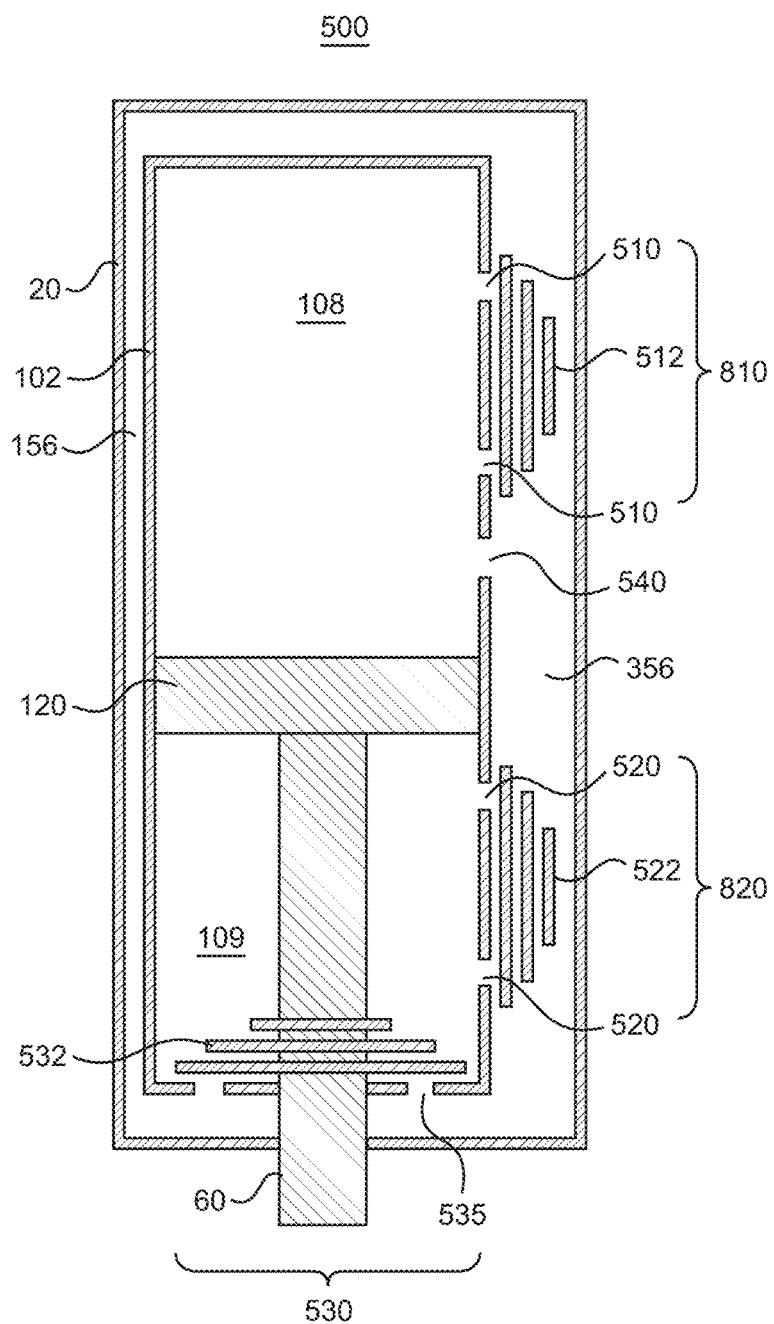
FIG. 11 is a schematic diagram of the damper of FIG. 1 showing a bypass assembly configuration, in accordance with one embodiment.

Referring now to FIG. 11, a schematic diagram of a bypass assembly 500 is shown in accordance with one embodiment. In bypass assembly 500, the valve control flow from the chamber (e.g., compression volume 108) to the annular region is fundamentally different than existing bypass architecture. The new architecture of bypass assembly 500 controls the flow from the annular region into the main chamber during the movement of the damping piston 120 in one direction (e.g., compression or rebound) and then checks the flow in the other direction (e.g., the other of compression or rebound).

In one embodiment, bypass assembly 500 includes a bearing bypass 530 that is located inside of the damping cylinder 20 and tubular body 102. In one embodiment, the bearing bypass 530 is used as part of the compression bypass for the ride zone.

In one embodiment, bypass assembly 500 is designed to permit damping fluid to travel from a first side of the damping piston 120 to the other side without traversing a shimmed flow path in damping piston 120 that may otherwise be traversed in a compression and/or rebound stroke of the damping piston 120. The bypass assembly 500 includes a tubular body 102 that is coupled with the damping cylinder 20 to form an annular region 156 that includes a bypass fluid path 356. In one embodiment, bypass assembly 500 includes compression-side bypass orifices 510, rebound-side bypass orifices 520, bearing bypass 530, refill hole(s) 540, and bypass path using bypass fluid path 356 of annular region 156.

In one embodiment, a needle-type throttle and valve 532 (hereinafter "valve 532" or "throttle/valve 532", used interchangeably herein), allowing flow in one direction and checking flow in the opposite direction, is located proximate to (e.g., within enough distance to control the flow of working fluid through) bearing bypass aperture 535 of bearing bypass 530.

In one embodiment, bypass assembly 500 includes a compression bypass system 810 comprising a compression valve 512 (e.g., a needle-type throttle and compression valve, a compression throttle/valve, and the like) that is used to control fluid flow through compression-side bypass orifices 510, and thus into or out of compression volume 108. In one embodiment, bypass assembly 500 includes a rebound bypass system 820 comprising a rebound valve 522 (e.g., a needle-type throttle and rebound valve, a rebound throttle/valve, and the like) that is used to control fluid flow through rebound-side bypass orifices 520, and thus into or out of rebound volume 109.

For purposes of clarity, the discussion of the operation of compression bypass system 810 and rebound bypass system 820 is broken down into specific examples of operation in FIGS. 17A-18B. However, it should be appreciated that the bypass assembly 500 of FIG. 11 could use one, or a combination of the different examples of operation, such as one or both of the compression bypass system 810 configurations shown in FIGS. 17A and 17B. It should also be appreciated that the bypass assembly 500 of FIG. 11 could use one, or a combination of the different examples of operation, such as one or both of the rebound bypass system 820 configurations shown in FIGS. 18A and 18B.

In one embodiment, the duplication of the bypass system configurations could be used for purposes of redundancy, robustness, increases in system pressures or vehicle utilization (e.g., small vehicle versus large vehicle, normal operation versus high speed/high use case operation, weight savings (e.g., two smaller rebound valve 522 or compression valve 512 configurations performing a task otherwise accomplished by a larger heavier single rebound valve 522 or compression valve 512 configuration, etc.), and the like.

Referring now to FIG. 17A, a schematic diagram of a bypass assembly configuration 500A having only a compression bypass system 810 is shown in accordance with one embodiment. As shown in FIG. 17A, the shock assembly (including damping cylinder 20 and tubular body 102) is in compression and piston rod 60 is driving damping piston 120 upward into the compression volume 108. In one embodiment, compression bypass system 810 includes compression-side bypass orifices 510, refill hole(s) 540, and a compression valve 512 (e.g., a needle-type throttle and compression valve, a compression throttle/valve, and the like). In one embodiment, the flow of fluid through the compression bypass system 810 is indicated by bypass fluid path 256. For example, out of compression volume 108, through compression bypass system 810, e.g., through compression-side bypass orifices 510, along the bypass channel 521, through refill hole(s) 540, and into rebound volume 109.

In one embodiment, compression valve 512 is located proximate to (e.g., within enough distance to control the flow of working fluid through) compression-side bypass orifices 510 on the exterior of tubular body 102 and controls the fluid flow direction therethrough, e.g., out of, and not into, compression volume 108.

In other words, compression valve 512 allows flow in one direction. For example, compression valve 512 allows fluid flow out of the compression volume 108 via compression-side bypass orifices 510 while checking fluid flow into the compression volume 108 via compression-side bypass orifices 510.

Referring now to FIG. 17B, a schematic diagram of another bypass assembly configuration 500B having only compression bypass system 810 is shown in accordance with one embodiment. As shown in FIG. 17B, the shock assembly (including damping cylinder 20 and tubular body 102) is in compression and piston rod 60 is driving damping piston 120 upward into the compression volume 108. In one embodiment, compression bypass system 810 includes rebound-side bypass orifices 520, refill hole(s) 540, and a compression valve 512. In one embodiment, the flow of fluid through the compression bypass system 810 is indicated by bypass fluid path 256. For example, out of compression volume 108, through refill hole(s) 540, along the bypass channel 521, through compression bypass system 810, e.g., through rebound-side bypass orifices 520, and into rebound volume 109.

In one embodiment, compression valve 512 is located proximate to (e.g., within enough distance to control the flow of working fluid through) rebound-side bypass orifices 520 on the interior of tubular body 102 and controls the fluid flow direction therethrough, e.g., into, and not out of, rebound volume 109.

In other words, compression valve 512 allows flow in one direction. For example, compression valve 512 allows fluid flow into the rebound volume 109 via rebound-side bypass orifices 520 while checking fluid flow out of the rebound volume 109 via rebound-side bypass orifices 520.

Figure 18A:
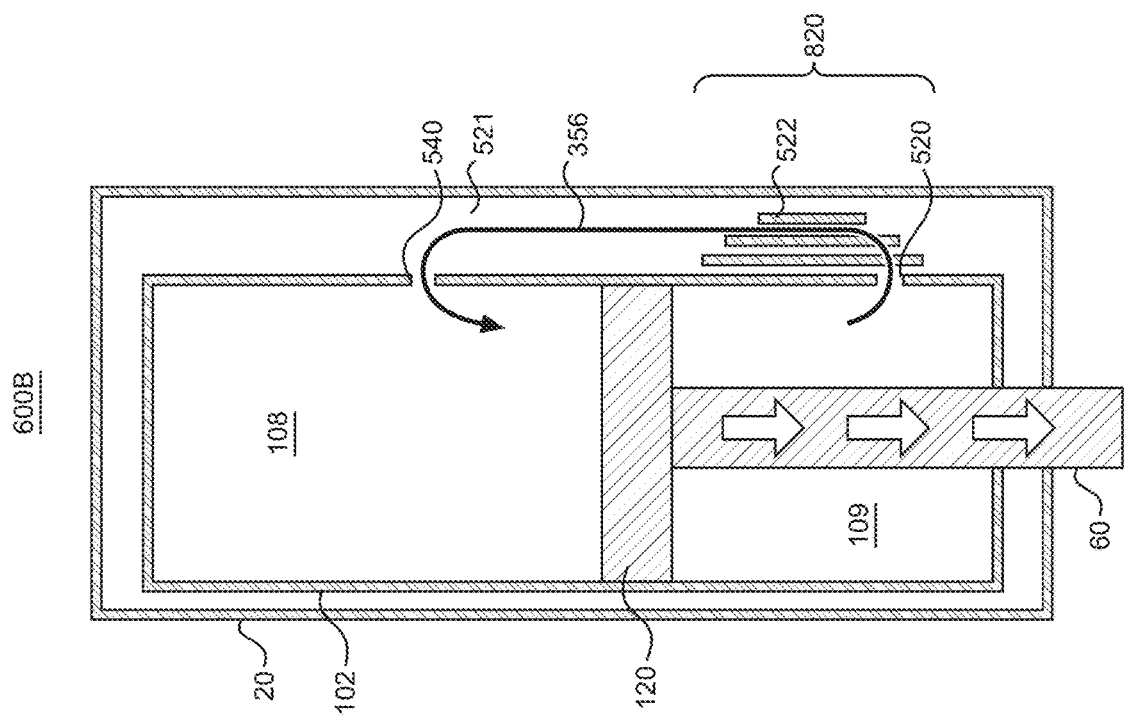
FIG. 18A is a schematic diagram of a bypass assembly configuration for a rebound bypass, in accordance with one embodiment.

With reference now to FIG. 18A, a schematic diagram of a bypass assembly configuration 600A having only a rebound bypass system 820 is shown in accordance with one embodiment. As shown in FIG. 18A, the shock assembly (including damping cylinder 20 and tubular body 102) is in rebound and piston rod 60 is pulling damping piston 120 downward into the rebound volume 109. In one embodiment, rebound bypass system 820 includes compression-side bypass orifices 510, refill hole(s) 540, and a rebound valve 522 (e.g., a needle-type throttle and rebound valve, a rebound throttle/valve, and the like). In one embodiment, the flow of fluid through the rebound bypass system 820 is indicated by bypass fluid path 356. For example, out of rebound volume 109 via refill hole(s) 540, along the bypass channel 521, through rebound bypass system 820, e.g., through rebound valve 522 on compression-side bypass orifices 510 and into compression volume 108.

In one embodiment, rebound valve 522 is located proximate to (e.g., within enough distance to control the flow of working fluid through) compression-side bypass orifices 510 on the interior of tubular body 102 and controls the fluid flow direction therethrough, e.g., into, and not out of, compression volume 108.

In other words, rebound valve 522 allows fluid flow in one direction. For example, rebound valve 522 allows fluid flow into the compression volume 108 via compression-side bypass orifices 510 while checking the fluid flow in the opposite direction, e.g., out of compression volume 108 via compression-side bypass orifices 510.

Figure 18B:
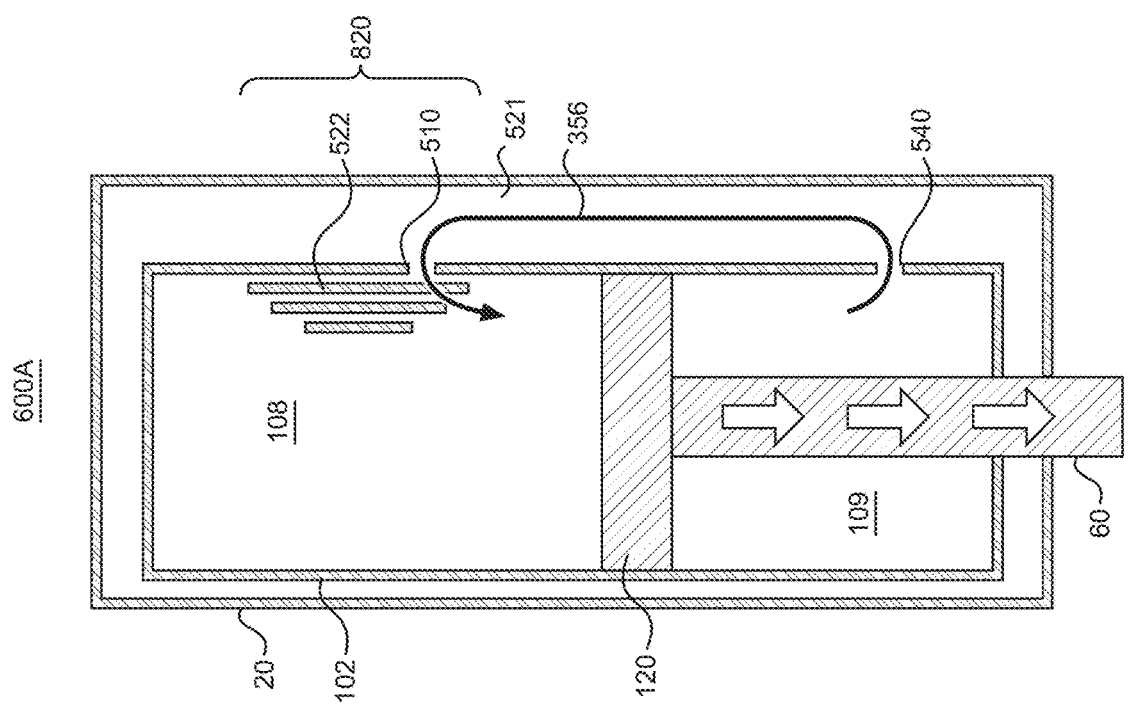
FIG. 18B is a schematic diagram of another bypass assembly configuration for a rebound bypass, in accordance with one embodiment.

With reference now to FIG. 18B, a schematic diagram of another bypass assembly configuration 600B having only rebound bypass system 820 is shown in accordance with one embodiment. As shown in FIG. 18B, the shock assembly (including damping cylinder 20 and tubular body 102) is in rebound and piston rod 60 is pulling damping piston 120 downward into the rebound volume. In one embodiment, rebound bypass system 820 includes rebound-side bypass orifices 520, rebound valve 522, and refill hole(s) 540. In one embodiment, the flow of fluid through the rebound bypass system 820 is indicated by bypass fluid path 356. For example, out of rebound volume 109 via rebound bypass system 820, e.g., through rebound valve 522 on rebound-side bypass orifices 520, along the bypass channel 521, and through refill hole(s) 540 into compression volume 108.

In one embodiment, rebound valve 522 is located proximate to (e.g., within enough distance to control the flow of working fluid through) rebound-side bypass orifices 520 on the exterior of tubular body 102 and controls the fluid flow direction therethrough, e.g., out of, and not into, rebound volume 109.

In other words, rebound valve 522 allows fluid flow in one direction. For example, rebound valve 522 allows fluid flow out of the rebound volume 109 via rebound-side bypass orifices 520 while checking the fluid flow in the opposite direction, e.g., into rebound volume 109 via rebound-side bypass orifices 520.

Referring again to FIG. 11, to provide one of the fluid pathways for fluid communication between the compression volume 108 and the rebound volume 109, a plurality of openings (or apertures) are provided through the wall of tubular body 102 making a fluid bypass path through annular region 156 between tubular body 102 and the damping cylinder 20.

Thus, during movement of the damping piston 120 within the damping cylinder 20, fluid may flow between the compression volume 108 and the rebound volume 109 portions of the damping cylinder 20 as the actual volume (size) of those volumes change as the damping piston 120 moves within the tubular body 102.

For example, in one embodiment during a compression stroke the fluid will flow from compression volume 108 into compression-side bypass orifices 510 passing through compression valve 512 and taking the fluid bypass path through annular region 156 to bearing bypass aperture 535 where it will pass through bearing bypass valve 532 and flow into the rebound volume 109.

In contrast, in one embodiment during a rebound stroke the fluid will flow from rebound volume 109 into rebound-side bypass orifices 520 passing through rebound valve 522 and taking the fluid bypass path through annular region 156 to refill hole(s) 540 where it will flow into the compression volume 108.

In one embodiment, this flow occurs as long as damping piston 120 is disposed between the rebound-side bypass orifices 520 and the refill holes(s) 540 or position-sensitive bleeds 555. For example, wherein compression-side bypass orifices 510 are on one side of the damping piston 120 and rebound-side bypass orifices 520 is on another side of the damping piston 120, flow may occur therethrough between the rebound volume 109 and the compression volume 108, respectively in a manner as recited above. These openings, and fluid bypass path through annular region 156 thus provide a direct, (though possibly restricted by the cross section of annular region 156 and any valves restricting any or all of the apertures), flow path for fluid between the compression volume 108 and the rebound volume 109 during damping piston 120 movement within the tubular body 102 of damping cylinder 20.

In one embodiment, rebound-side bypass orifices 520, bearing bypass apertures 535, and refill hole(s) 540 are provided along the longitudinal axis of damping cylinder 20. As a result, when damping piston 120 traverses within the tubular body 102 in the direction of the valved interconnection housing 40 (e.g., when the shock assembly 10 is in a compression stroke), individual ones of the rebound-side bypass orifices 520, bearing bypass apertures 535, and refill hole(s) 540 will be encountered and selectively blocked by the damping piston 120. Further, as damping piston 120 passes an aperture, the number of rebound-side bypass orifices 520, bearing bypass apertures 535, and refill hole(s) 540 available to form a communication path from the compression volume 108 on one side of the damping piston 120 to the rebound volume 109 on the other side of the damping piston 120, and vice-versa, will change.

In one embodiment, bearing bypass valve 532 sets flow resistance through the bypass assembly 500 during the compression stroke and restricts fluid from entering the bypass assembly 500 during the rebound stroke of the damping piston 120. In one embodiment, the bearing bypass valve 532 is spring loaded and biased closed. The initial compression force of the biasing spring can be preconfigured, or can include an adjustment capability thereby allowing a user to preset the bearing bypass valve 532 opening pressure and hence the compression damping fluid flow rate through the bypass assembly 500. The biasing force of the bearing bypass valve 532 is overcome by fluid pressure in the tubular body 102 causing the bearing bypass valve 532 to open against the spring during a compression stroke.

Figure 12:
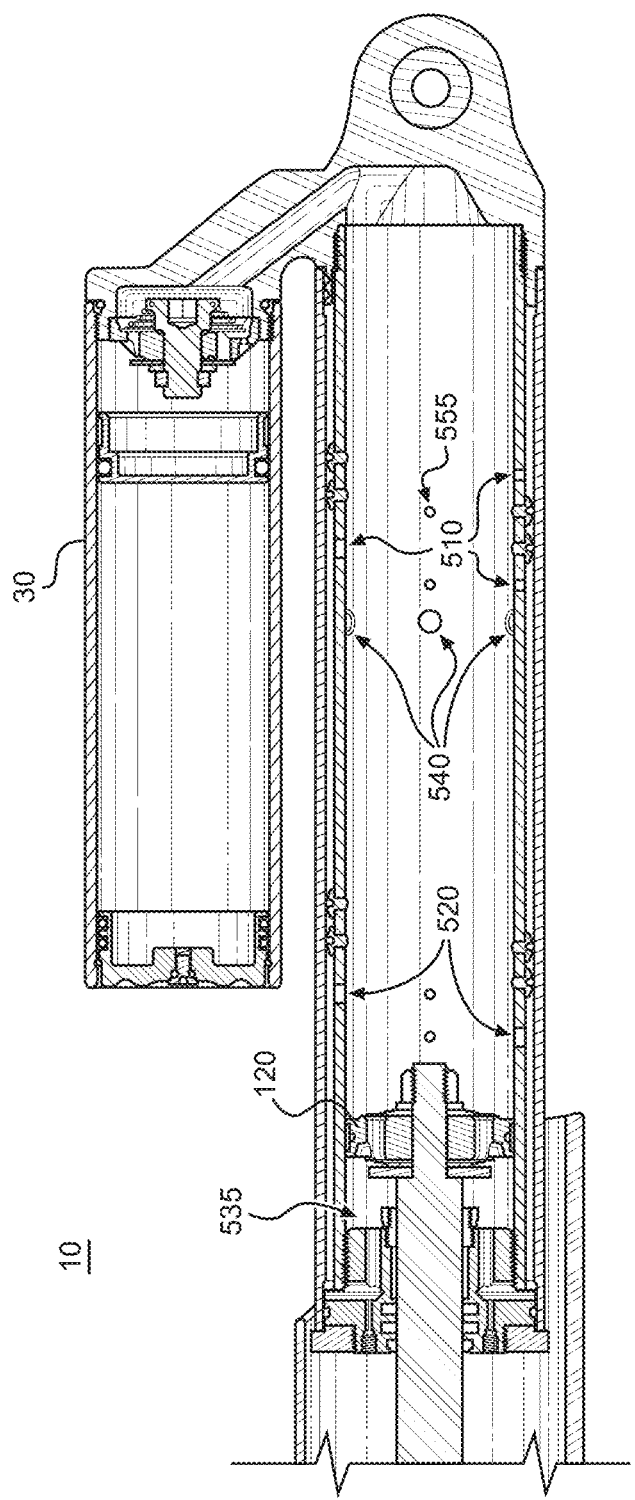
FIG. 12 is a side section view of a portion of the shock assembly described in the schematic diagram of FIG. 11, in accordance with one embodiment.

Referring now to FIG. 12, a side section view of a portion of shock assembly 10 is shown in accordance with one embodiment. In general, the side section view of FIG. 12 is based on the schematic diagram of FIG. 11 and as such, the discussion of the similar features will not be repeated for purposes of clarity. However, the discussion of FIG. 11 is incorporated by reference in its entirety.

Figure 13:
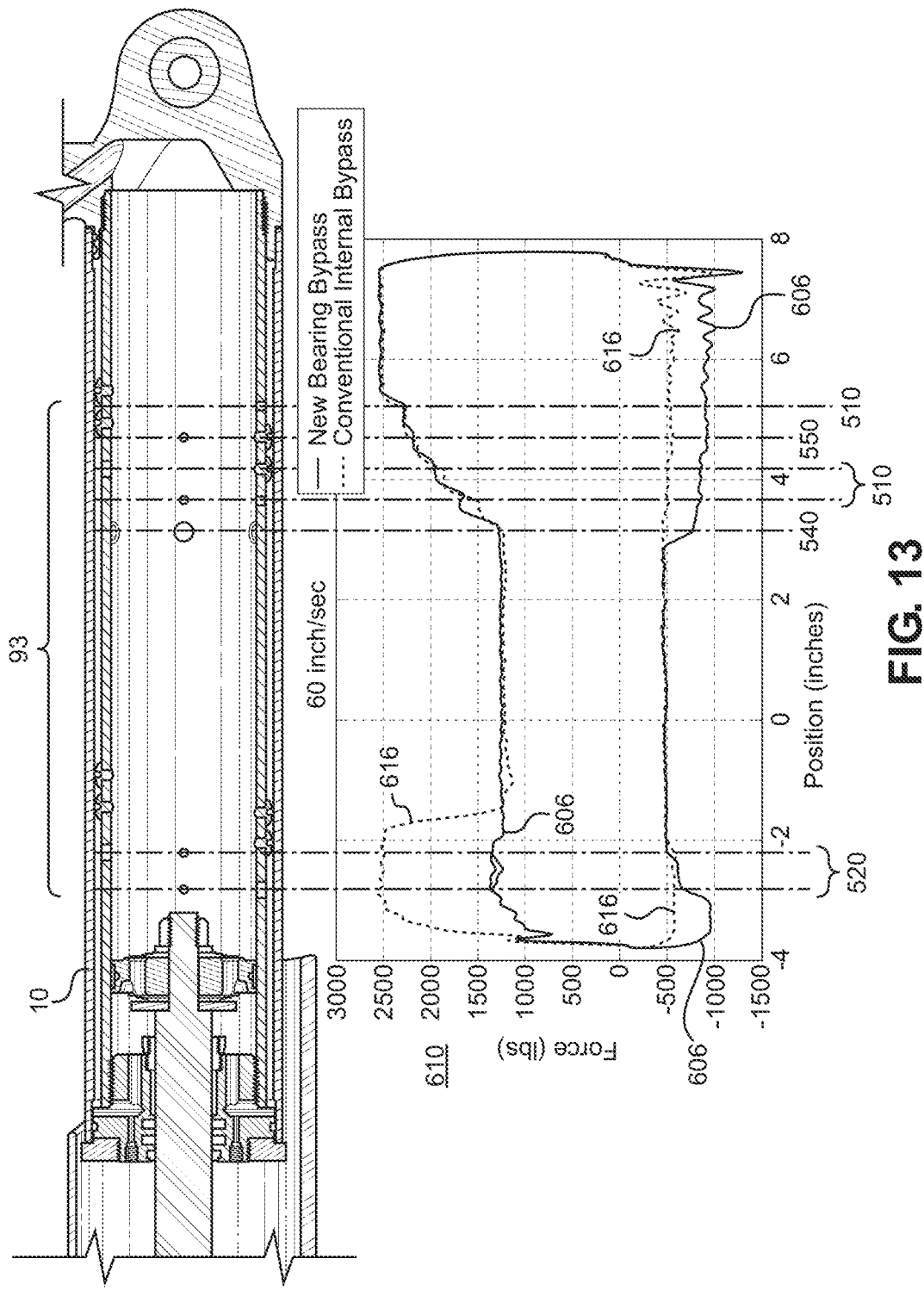
FIG. 13 is a side section view of the portion of shock assembly from FIG. 12 with a graph thereunder illustrating the performance difference in both rebound and compression, shown in accordance with one embodiment.

In one embodiment, the refill hole(s) 540 have been moved to the top of the ride zone (e.g., ride zone 93 shown in FIG. 13). In one embodiment, a number of rebound-side bypass orifices 520 have been added to the bypass assembly 500. In one embodiment, a number of compression-side bypass orifices 510 have been added to the bypass assembly 500.

In one embodiment, the compression-side bypass orifices 510 are located towards the remote reservoir 30 porting end of the damping cylinder 20 (i.e., the "top end" of the damping cylinder 20 near which the damping piston 120 would be located at the end of a compression stroke). In one embodiment, as selected by design, the bypass assembly 500 will not operate after the damping piston 120 passes the compression-side bypass orifices 510 near the end of a compression stroke. In one embodiment, the compression-side bypass orifices 510 are located elsewhere in the stroke as desired. This "damping piston 120 position sensitive" feature ensures increased damping will be in effect near the end of the compression stoke to help prevent the damping piston 120 from approaching a "bottomed out" position (e.g. impact) in the damping cylinder 20. In some instances, multiple bypasses are used with a single damper and the entry pathways for each may be staggered axially along the length of the damping cylinder 20 in order to provide an ever-increasing amount of damping (and less fluid flow through the bypass assembly 500) as the damping piston 120 moves through its compression stroke and towards the "top end" of the damping cylinder 20.

In one embodiment, the rebound-side bypass orifices 520 are located towards the piston rod 60 end of the damping cylinder 20 (i.e., the "bottom" end of the damping cylinder 20 near which the damping piston 120 would be located at the end of a rebound stroke). In one embodiment, as selected by design, the bypass assembly 500 will not operate after the damping piston 120 passes the rebound-side bypass orifices 520 near the end of a rebound stroke. In one embodiment, the rebound-side bypass orifices 520 are located elsewhere in the stroke as desired. This "damping piston 120 position sensitive" feature ensures increased damping will be in effect near the end of the rebound stoke to help prevent the damping piston 120 from approaching a "topped out" position in the damping cylinder 20. In some instances, multiple rebound-side bypass orifices 520 are used with a single damper and the entry pathways for each may be staggered axially along the length of the damping cylinder 20 in order to provide an ever-increasing amount of damping (and less fluid flow through the bypass assembly 500) as the damping piston 120 moves through its rebound stroke and towards the "bottom" of the damping cylinder 20.

Referring now to FIG. 13, a side section view of the portion of shock assembly 10 from FIG. 12 is shown in conjunction with a graph 610 thereunder in accordance with an embodiment. In shock assembly 10, the refill hole(s) 540 are located at the top of the ride zone 93 (e.g., at the most compressed side of ride zone 93). In one embodiment, shock assembly 10 includes a number of rebound-side bypass orifices 520 as part of the bypass assembly 500. In one embodiment, shock assembly 10 also includes a number of compression-side bypass orifices 510 as part of the bypass assembly 500. In one embodiment, shock assembly 10 includes one or more position sensitive bleeds 555. In FIG. 13, the different bypasses, orifices, and bleeds are shown axially along the shock assembly 10 in a same plane as damping piston 120. In one embodiment, there are a plurality of different bypasses, orifices, and bleeds located around the circumference of the housing of shock assembly 10 in approximately the same plane. In one embodiment, there may be one or a plurality of the different bypasses, orifices, and bleeds located around the housing of shock assembly 10 that are not in the same plane.

Graph 610 is a force (lbs.) v. position (inches) graph that illustrates the performance difference in both rebound and compression between the new bypass assembly 500 configuration and a conventional bypass configuration and is shown in accordance with one embodiment.

Figure 14:
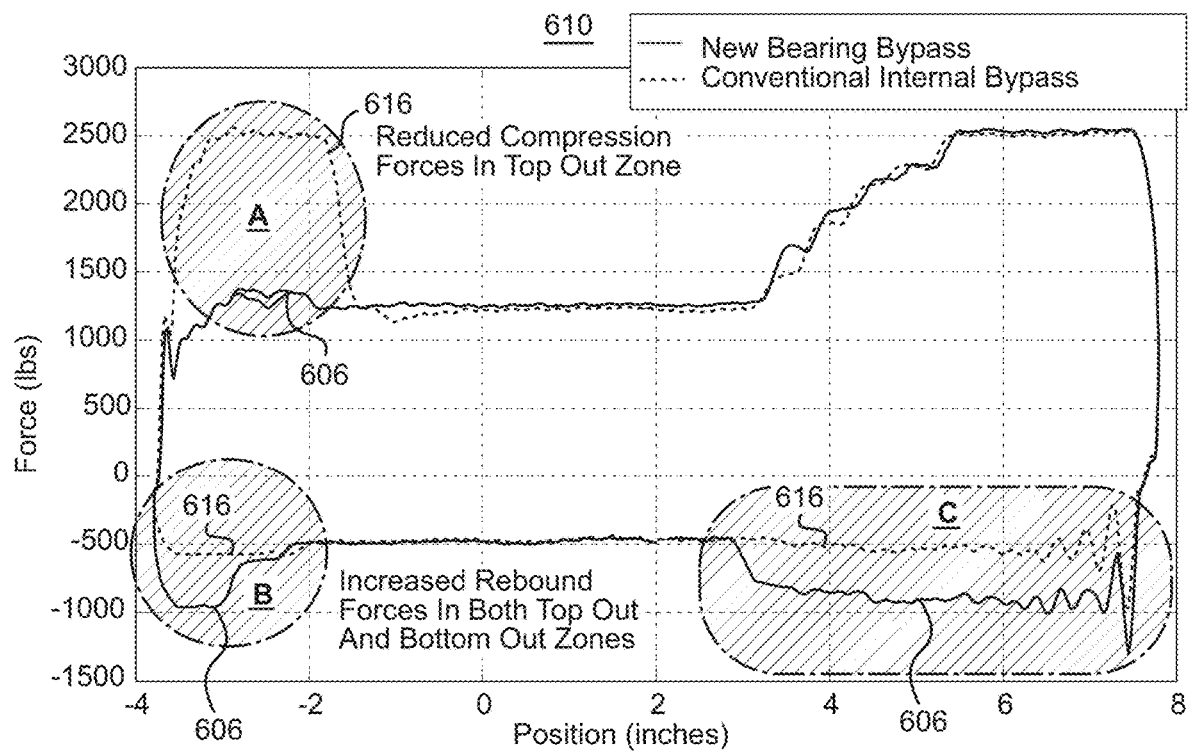
FIG. 14 is a graph illustrating the performance difference in both rebound and compression, in accordance with one embodiment.
Figure 15:
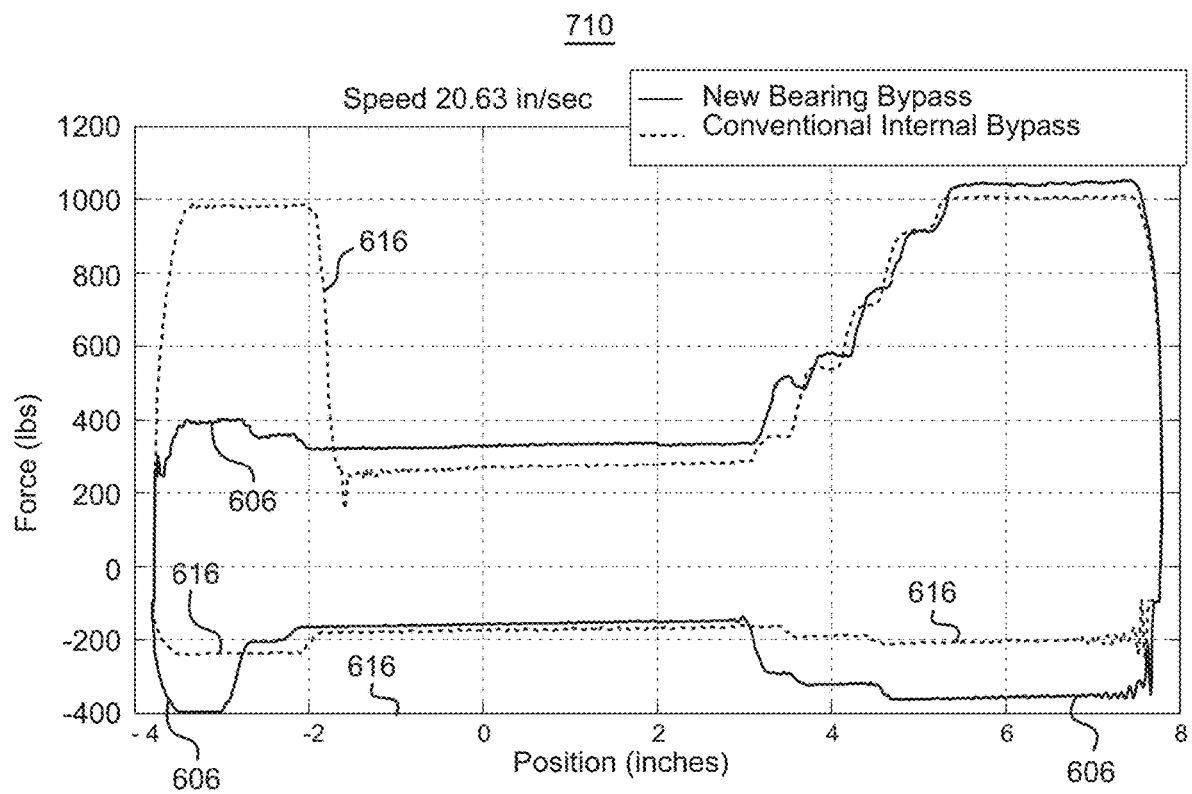
FIG. 15 is a graph illustrating the performance difference in both rebound and compression at a different speed than that of the graphs of FIGS. 13 and 14, in accordance with one embodiment.

In graph 610, the measurements were taken at 60 inch/second. In each of FIG. 13-15, the conventional bypass results are marked as conventional results 616 while the bypass assembly 500 performance results are marked as new and unexpected results 606. As shown in FIGS. 13-15, in one embodiment, the bypass assembly 500 is able to provide the feel of a less restrictive rebound valving in the damping piston 120 while actually utilizing a more restrictive rebound valving in the damping piston 120, to achieve a desired level of restrictive flow at top out by utilization of the valving of the present embodiment.

Thus, in one embodiment, the damping piston 120 valving is actually twice as restrictive as in a conventional structure. So, for example, the damping piston 120 can now be set to 1000 lbs. instead of 500 lbs. However, because of the performance characteristics of the bypass assembly 500 structure and components, the damping piston 120 forces will feel (and be) lighter until they meet the end of the ride zone area and begin to pass the rebound-side bypass orifices 520, compression-side bypass orifices 510, refill hole(s) 540, and/or the like.

FIG. 14 is a graph illustrating the performance difference in both rebound and compression, in accordance with one embodiment. As shown in graph 610, of FIG. 13 and highlighted in graph 610 of FIG. 14, bypass assembly 500 with the bearing bypass 530 configuration eliminates the "convention bypass configuration" compression nose (as shown in highlighted area A; e.g., 616 is reduced to 606) while still allowing for a rebound top out (rebound catch) (as shown in highlighted area B; e.g., the negative forces of 606 are almost double those of conventional results 616). Moreover, bypass assembly 500 increase higher rebound characteristics at the end of stroke (as shown in highlighted area C, again the negative forces of 606 are almost double those of conventional results 616). For example, in one embodiment by having the larger size or quantities of holes (510/520), the force 606 can be more than double conventional ride zone forces 616 while the piston 120 would be more than half as restrictive.

Thus, the addition of the bearing bypass 530, movement of refill hole(s) 540, and overall modifications that are indicative of the novel structure of bypass assembly 500 soften the compression nose at both ends of the stroke (e.g., bottom out and top out).

In one embodiment, the ride zone 93 is indicated by the range bracket. However, it should be appreciated that ride zones may be larger or smaller depending upon shock assembly type, terrain, vehicle type, vehicle use, factory settings, post-factory tuning (e.g., mechanic, do-it-yourself (DIY) owner, or the like).

In one embodiment, the "open" or "lift" or actuation pressure of one or more of the valves can be modified by the manufacturer or by a shop or by a user to adjust the damping parameters and/or characteristics of the shock assembly 10. In one embodiment, the manufacturer can move aperture positions, sizes, shapes, location, etc. to modify the compression and rebound performance curves. Moreover, in one embodiment, the location of the apertures can be also tuned to modify a size of the ride zone 93, and the like. For example, some vehicles benefit from a longer ride zone while others work better with a smaller ride zone 93.

With reference now to FIG. 15, a graph 710 illustrating the performance difference in both rebound and compression at a different speed than that of the graphs of FIGS. 13 and 14 is shown in accordance with one embodiment. In general, graph 710 is a force (lbs.) versus position (inches) graph that illustrates the performance difference in both rebound and compression between the new bypass assembly 500 configuration and a conventional bypass configuration and is shown in accordance with one embodiment. In graph 710, the measurements were taken at 20.63 inch/second.

In one embodiment, while operating a 20.63 inches/second, bypass assembly 500 eliminates the "convention bypass configuration" compression nose (as shown where 616 is reduced to 606) while still allowing for a rebound top out (rebound catch) (as shown by the negative forces of 606 are almost double those of conventional results 616). Moreover, bypass assembly 500 increase higher rebound characteristics at the end of stroke (as shown where the negative forces of 606 are almost double those of conventional results 616).

Referring now to FIG. 16, a table 793 showing the new and unexpected results and sizing for one embodiment, as a comparison of the conventional results 616 and the new and unexpected results 606.

In one embodiment, the bearing bypass valve 580 is a check valve, shim stack, etc. In another embodiment, the bearing bypass is a regular valve, active valve, e-valve, etc.

Additional bypass damper features, characteristics, and capabilities are described and shown in U.S. Pat. Nos. 6,296,092; 6,415,895; and 8,763,770, each of which is incorporated herein, in its entirety, by reference.

Figure 3:
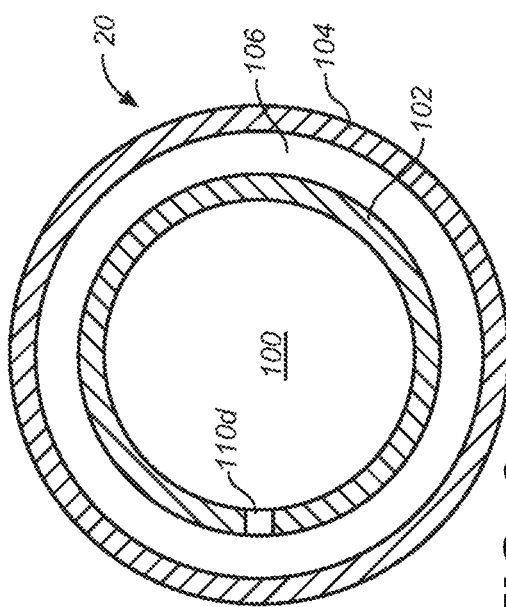
FIG. 3 is a sectional view of the shock assembly of FIG. 2 at section 3-3, in accordance with one embodiment.
Figure 4:
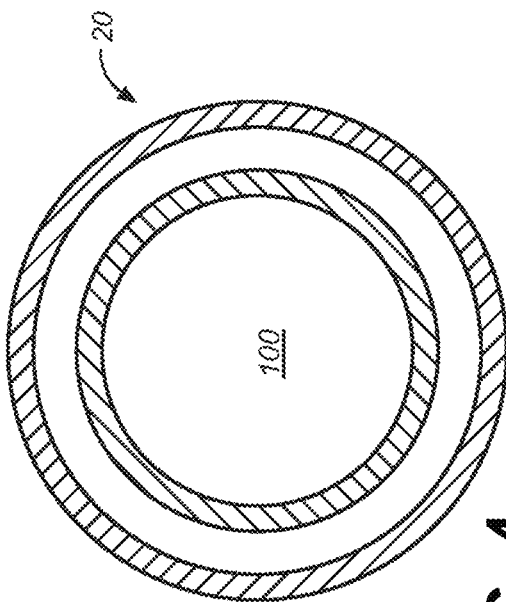
FIG. 4 is a sectional view of the shock assembly of FIG. 2 at section 4-4, in accordance with one embodiment.
Figure 5:
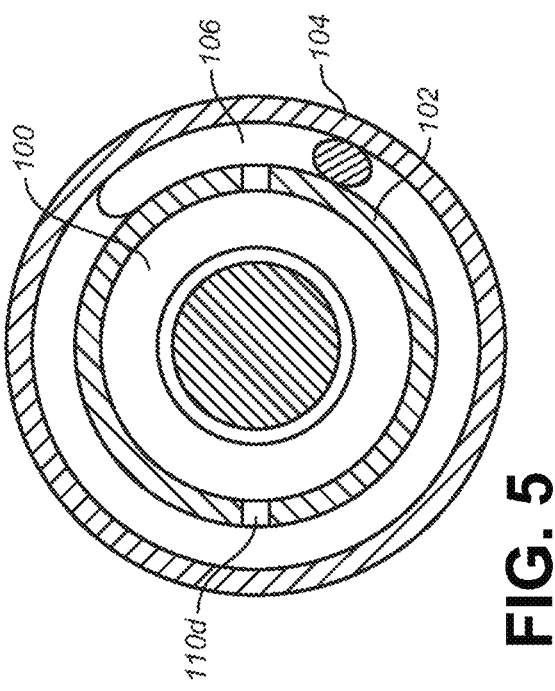
FIG. 5 is a sectional view of the shock assembly of FIG. 2 at section 5-5, in accordance with one embodiment.
Figure 6:
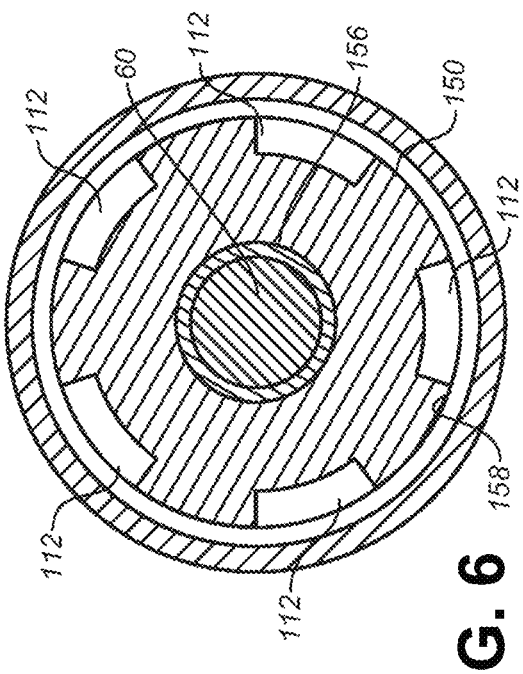
FIG. 6 is a sectional view of the shock assembly of FIG. 2 at section 6-6, in accordance with one embodiment.

For active valves, including those used for, compression and/or rebound stiffness adjustments, preload adjustments, bottom-out control, preload adjustment, and ride height adjustment see, as an example, the electronic valve of FIGS. 2-4 of U.S. Pat. No. 9,353,818 which is incorporated by reference herein, in its entirety, as further example of different types of "electronic" or "active" valves). See also, as an example, U.S. Pat. No. 9,623,716 which is incorporated by reference herein, in its entirety.

For additional detail and description of adjustable preload, crossover, bottom-out, see, as an example, U.S. Pat. No. 10,036,443 which is incorporated by reference herein, in its entirety.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

I claim:

1. A shock assembly comprising:
   a damper chamber comprising:
      an outer wall with a first inner diameter (ID);
   a secondary chamber within said damper chamber, said secondary chamber comprising an exterior wall with an external diameter (ED) less than said ID of said outer wall to form an annular region therebetween;
   a damping piston coupled to a piston rod, said damping piston disposed in said secondary chamber and axially movable relative to said secondary chamber, said damping piston to bifurcate said secondary chamber into a compression side and a rebound side;
   a valve to control a flow of a working fluid between said annular region and said secondary chamber; and
   a refill hole located within a ride zone portion of said damper chamber.

2. The shock assembly of claim 1 further comprising:
   at least two orifices selected from a group consisting of:
   at least one bearing bypass aperture at said rebound side of said secondary chamber, said at least one bearing bypass aperture fluidly coupled with said annular region;
   at least one compression-side bypass orifice at said compression side of said secondary chamber, said at least one compression-side bypass orifice fluidly coupled with said annular region; and
   at least one rebound-side bypass orifice at said rebound side of said secondary chamber, said at least one rebound-side bypass orifice fluidly coupled with said annular region.

3. The shock assembly of claim 2 further comprising:
   said valve configured to allow said working fluid to flow from said annular region into said rebound side, and limit a flow of said working fluid from said rebound side and into said annular region, via said at least one rebound-side bypass orifice during a compression stroke; and
   said valve located internal to said exterior wall of said secondary chamber and proximate said at least one rebound-side bypass orifice.

4. The shock assembly of claim 2 further comprising:
   said valve configured to allow said working fluid to flow from said annular region into said rebound side, and limit a flow of said working fluid from said rebound side and into said annular region, via said at least one bearing bypass aperture during a compression stroke; and
   said valve located internal to said exterior wall of said secondary chamber and proximate said at least one bearing bypass aperture.

5. The shock assembly of claim 2 further comprising:
   said valve configured to allow said working fluid to flow from said compression side into said annular region, and limit a flow of said working fluid from said annular region into said compression side, via said at least one compression-side bypass orifice during a compression stroke.

6. The shock assembly of claim 5 further comprising:
   said valve located external of said exterior wall of said secondary chamber and proximate said at least one compression-side bypass orifice.

7. The shock assembly of claim 2 further comprising:
   said valve to allow said working fluid to flow from said annular region into said compression side, and limit a flow of said working fluid from said compression side and into said annular region, via said at least one compression-side bypass orifice during a rebound stroke.

8. The shock assembly of claim 7 further comprising:
   said valve located internal to said exterior wall of said secondary chamber and proximate said at least one compression-side bypass orifice.

9. The shock assembly of claim 2 further comprising:
   said valve configured to allow said working fluid to flow from said rebound side into said annular region, and limit a flow of said working fluid from said rebound side into said annular region, via said at least one rebound-side bypass orifice during a rebound stroke.

10. The shock assembly of claim 9 further comprising:
    said valve located external of said exterior wall of said secondary chamber and proximate said at least one rebound-side bypass orifice.

11. A shock assembly comprising:
    a damper chamber comprising:
       an outer wall with a first inner diameter (ID);
       a tubular body within said damper chamber, said tubular body comprising an exterior wall with an external diameter (ED) less than said ID of said outer wall to form an annular region therebetween; and
       a fluid bypass within a portion of said annular region;
    a damping piston coupled to a piston rod, said damping piston disposed in said tubular body and axially movable relative to said tubular body, said damping piston to bifurcate said tubular body into a compression side and a rebound side;
    a valve to control a flow of a working fluid between said fluid bypass and said tubular body; and
    a refill hole located within a ride zone portion of said damper chamber.

12. The shock assembly of claim 11 further comprising:
    at least one compression-side bypass orifice at said compression side of said tubular body, said at least one compression-side bypass orifice fluidly coupled with said annular region; and
    at least one rebound-side bypass orifice at said rebound side of said tubular body, said at least one rebound-side bypass orifice fluidly coupled with said annular region.

13. The shock assembly of claim 12 further comprising:
    said valve configured to allow said working fluid to flow from said annular region into said rebound side, and limit a flow of said working fluid from said rebound side and into said annular region, via said at least one rebound-side bypass orifice during a compression stroke; and
    said valve located internal to said exterior wall of said tubular body and proximate said at least one rebound-side bypass orifice.

14. The shock assembly of claim 12 further comprising:
    said valve configured to allow said working fluid to flow from said compression side into said annular region, and limit a flow of said working fluid from said annular region into said compression side, via said at least one compression-side bypass orifice during a compression stroke; and said valve located external of said exterior wall of said tubular body and proximate said at least one compression-side bypass orifice.

15. The shock assembly of claim 12 further comprising:

said valve to allow said working fluid to flow from said annular region into said compression side, and limit a flow of said working fluid from said compression side and into said annular region, via said at least one compression-side bypass orifice during a rebound stroke; and said valve located internal to said exterior wall of said tubular body and proximate said at least one compression-side bypass orifice.

16. The shock assembly of claim 12 further comprising:

said valve configured to allow said working fluid to flow from said rebound side into said annular region, and limit a flow of said working fluid from said rebound side into said annular region, via said at least one rebound-side bypass orifice during a rebound stroke; and said valve located external of said exterior wall of said tubular body and proximate said at least one rebound-side bypass orifice.

\* \* \* \* \*